G. V. BALLARD.
REVOLVING FISH SCREEN.
APPLICATION FILED AUG. 26, 1912.
1,063,316.
Patented June 3, 1913.
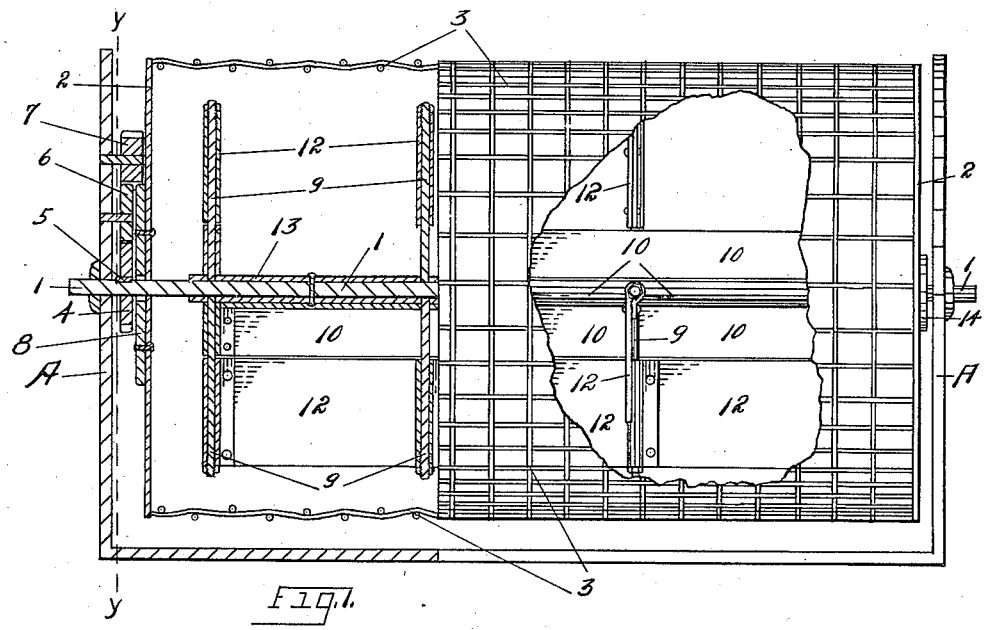
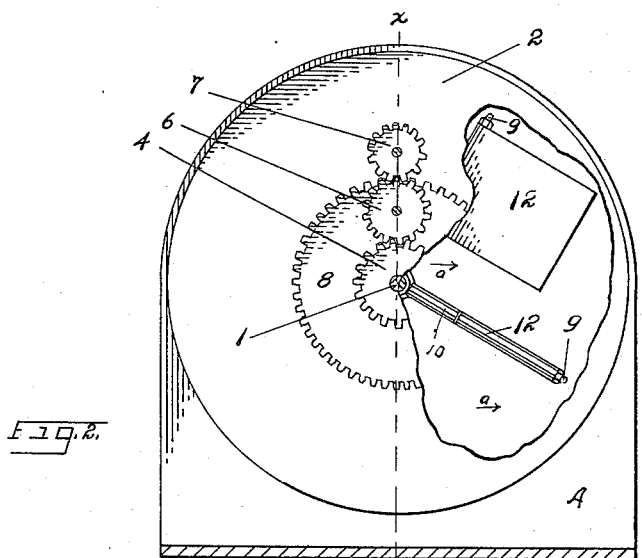
Witnesses:
F. H. Thomas.
Sam Raney
George V. Ballard, Inventor.
by J. M. Thomas, Attorney.
COLUMBIA PLANOGRAPH CO., WASHINGTON, D. C.

UNITED STATES PATENT OFFICE.

GEORGE V. BALLARD, OF SALT LAKE CITY, UTAH, ASSIGNOR, BY MESNE ASSIGNMENTS, TO FRANKLIN SPENCER, JR., OF LOS ANGELES, CALIFORNIA.

REVOLVING FISH-SCREEN.

1,063,316.      Specification of Letters Patent.      Patented June 3, 1913.

Application filed August 26, 1912. Serial No. 717,210.

*To all whom it may concern:*

Be it known that I, GEORGE V. BALLARD, citizen of the United States, residing at Salt Lake City, in the county of Salt Lake and State of Utah, have invented certain new and useful Improvements in Revolving Fish-Screens, of which the following is a specification.

My invention relates to fish screens of the drum type, and has for its object to provide a revolving drum screen for fishways, simple and economical in construction, efficient in operation and one that will free itself from leaves, moss or debris floating in a running stream in which said screen is placed; and which will prevent fish from passing up or down said stream. These and other objects which will be apparent I accomplish with the device illustrated in the accompanying drawings, in which similar letters of reference indicate like parts throughout the several figures and as described in the specifications forming a part of this application and as pointed out in the appended claims.

Figure 1 is a side elevation of the device, parts cut away and parts shown in section on line *x x* of Fig. 2. Fig. 2 is an end elevation of the device on line *y y* of Fig. 1, parts cut away.

My device consists of a frame A which is placed in a running stream, and has a shaft 1 horizontally mounted therein with the bearings for said shaft at or above the level of the water. Carried on said shaft 1 is a drum screen consisting of two circular disks 2; on the peripheral edges of which is fastened a piece of foraminous material to form a drum 3. Said drum may be made of wire screen likewise fastened on said disks. A gear wheel 4 is rigidly fastened on said shaft 1 adjacent one side of said frame A, by means of a key 5. An idler gear 6 is mounted in the same side of said frame A, the teeth of which mesh with the teeth of said gear wheel 4. Another gear wheel 7 is likewise mounted in said frame A with its teeth meshing with the teeth of said idler gear 6 and with the teeth of another gear wheel 8, which is journaled on said shaft 1, and to which one of said disks 2 is riveted. The other disk 2 is riveted to a journal 14 which is carried on said shaft 1. Securely fastened on said shaft 1 and concentrically within said drum screen is a power wheel, consisting of a sleeve 13, to which a number of spokes 9 are fastened at their base. Said spokes 9 are placed in rows and in horizontal alinement with each other. Radially disposed and longitudinally placed blades 10 are fastened to said spokes, preferably of a width equal to one third the length of the said spokes. Each of said blades 10 extend the full length of the power wheel and their intermediate portions are supported by said spokes 9. On each of said spokes except on the outer ones of each row is placed a swinging blade 12, of a width equal to the length of the free end of said spoke, and of length sufficient that when swung on its pivot, parallel with one of said blades 10, it will engage and rest on the next spoke in that row of spokes.

In the operation of my device, and with the power wheel partially or fully submerged, and the water in the stream flowing in the direction of the arrow *a*, the current will act on the swinging blades 12 and cause each to turn on its pivot—one of said spokes 9—until the free end of the said blades will engage or rest on the next spoke in horizontal alinement therewith. Each blade 12 in that row will be similarly swung and equally acted upon by the current; thereby forming a vane or blade made up of one horizontal blade 10 and all of the said blades 12 in that row. In the drawings there are three of said blades 12 shown. Each of said blades 12 swings with and is acted upon individually by the current when passing in an undershot direction or below the said shaft 1. After the engagement of the free end thereof the force of the flowing water will cause said shaft to rotate. Motion will be imparted thereby through said gear wheels to said drum screen, and it will be rotated in the opposite direction. Any debris which may be carried in the water will be screened from and kept out of the said power wheel, and will be carried over the top of the drum and washed off on the down stream side. If said power wheel is submerged in the water until there is a flow of water over said shaft 1, the said blades 12 will be swung on their pivots and while passing over said shaft will be parallel with the flow of the water and at right angles to said blades 10. In this position they offer such slight resistance to the flow that power enough is developed through said power wheel to keep said drum screen continuously rotating in the opposite direction to that of the wheel. Fish are kept from passing up or down said stream by said screen.

Having thus described my invention I desire to secure by Letters Patent and claim:—

1. A fish screen consisting of a horizontal shaft; a drum screen journaled thereon; a power wheel concentrically placed in said screen consisting of a sleeve on said shaft; spokes having their base end secured to said sleeve; radially disposed and longitudinally placed blades fastened to said spokes; other blades having one edge pivoted on one of said spokes and the free end adapted to engage the spoke adjacent when swung on its pivot by the current of a flowing stream; and a chain of gears coacting to impart the motion of said shaft to said drum screen to continuously rotate it in the reverse direction on said shaft.

2. A revolving screen consisting of a drum screen journaled on a horizontal shaft; a sleeve on said shaft; radial spokes spaced apart in rows and having the base of each secured to said sleeve; radially disposed blades fastened to the spokes in each row; swinging blades having one edge of each pivoted to one of said spokes and the opposite edge free to swing practically one quarter of a circle and to engage another of said spokes; and a chain of gears adapted to impart the motion of said shaft to said drum screen to rotate it in the opposite direction to that of said shaft.

3. A revolving fish screen consisting of a drum screen; a horizontal shaft; radially disposed spokes spaced apart in longitudinal rows on said shaft; radially disposed and longitudinally placed blades fastened on said spokes near the base thereof; other blades having one edge of each pivoted on the outer portion of said spokes and adapted when swung on their pivots to have their free ends engage an adjacent spoke; and intermeshing gears adapted to impart the motion of said shaft to said drum screen to rotate it in the reverse direction to that of said shaft.

4. A revolving fish screen consisting of a frame; a shaft horizontally mounted therein; a drum screen journaled on said shaft; a sleeve fastened on said shaft within said screen radial spokes spaced apart in longitudinal rows on said sleeve; longitudinally placed blades fastened to the lower end portion of said spokes; an outer blade pivoted on each of said spokes, except one of the end ones of each row, of length sufficient to engage the adjacent spoke when swung on its pivot by the current of a running stream to rotate said shaft; and intermeshing gears adapted to impart the motion of said shaft to said drum screen to rotate it in a reverse direction to that of said shaft, as and for the purposes described.

In testimony whereof I have affixed my signature in presence of two witnesses.

GEORGE V. BALLARD.

Witnesses:
SAM RANEY,
F. W. THOMAS.

---

Copies of this patent may be obtained for five cents each, by addressing the "Commissioner of Patents, Washington, D. C."